Nov. 17, 1953 W. L. McCLURE 2,659,633
SYSTEM FOR ELEVATING CONTACT MATERIAL
Filed Jan. 2, 1952
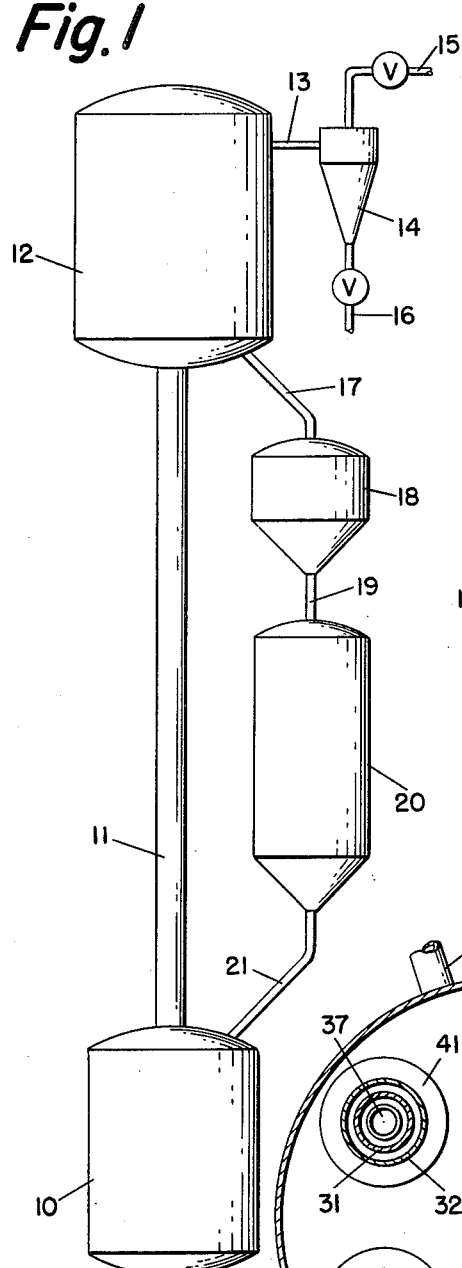
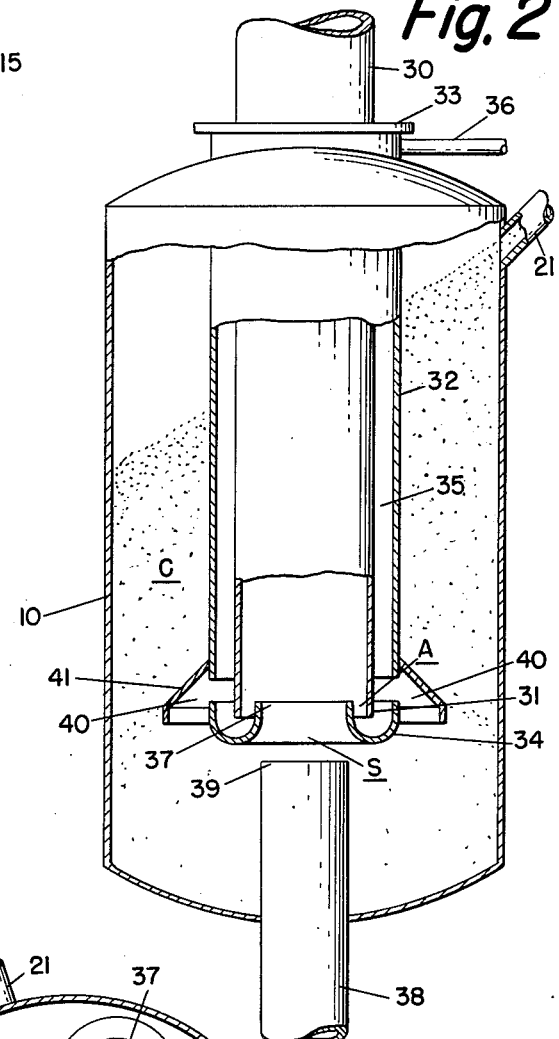
INVENTOR.
WILLIAM L. McCLURE
BY Busser and Smith
ATTORNEYS Patented Nov. 17, 1953

2,659,633

UNITED STATES PATENT OFFICE 2,659,633

SYSTEM FOR ELEVATING CONTACT MATERIAL

William L. McClure, Toledo, Ohio, assignor to Sun Oil Company, Philadelphia, Pa., a corporation of New Jersey Application January 2, 1952, Serial No. 264,472

3 Claims. (Cl. 302—53)

This invention relates to a system and apparatus for moving pneumatically granular or pelleted contact material or catalyst from a lower receptacle which receives the material in a continuous stream upwardly into and through an elongate conduit to an upper receptacle. In particular the invention is directed to apparatus for supplying gas or air to the material in the lower receptacle in order to convey it therefrom to and through the elongate conduit in such a manner as to reduce attrition of the material particles or pellets to a minimum during its passage to the upper receptacle.

It is well known in the art of catalysis, such as the cracking of heavier petroleum fractions to gasoline and other hydrocarbon processing operations, to use a catalytic or contact material in a continuous system. In such continuous systems a conversion zone is operated simultaneously with a second zone which is in regeneration. Most commercial moving or continuous catalyst systems have the conversion zone and regeneration zone in superposed relationship with the conversion zone usually above the regeneration zone so that the catalyst or contact material moves through the conversion zone to the regeneration zone by gravity and after regeneration it is carried upwardly and returned to the conversion zone to repeat the cycle of operation. To return the catalyst or contact material from the lower regenerating zone to the upper conversion zone two well known means applicable to the transportation of granular solids from one locus to another have been used, namely, by mechanical conveyors and by pneumatic conveyors, in the latter of which air, steam or flue gas produced at the refinery is readily available as the pneumatic lifting medium.

It is necessary in systems employing conversion and regeneration zones in superposed relationship to convey the catalyst or contact material which is usually in pelleted or granular form through a conduit several hundred feet in length in order to return it from the lower reaction zone to the upper reaction zone. From the lower reaction zone the material is delivered by gravity to a receptacle positioned at a level below that of the lower reaction zone, from which receptacle it is designed to effect or begin the lifting or upward conveying operation. In a pneumatic lifting system this lowermost receptacle is generally known in the art as an engager since the material is engaged therein by the lifting flue gas or air to effect the lifting operation. The lower end of the air lift conduit extends into or is in communication with the engager receptacle while the upper end of the lift conduit communicates with an upper receptacle positioned at a level above the top of the upper reaction zone or chamber. The upper receptacle is designed so that the lifting medium is separated from the catalyst or contact material and is generally known as the disengager.

The present invention involves a new way of conveying the catalyst, and at the same time introducing a high velocity lifting fluid, to the lower end of the lift conduit, so that the catalyst, after its conveyance to the lift conduit, will be conveyed by the lifting fluid upward through the lift conduit in a manner to reduce attrition of the catalyst to a minimum.

A complete understanding of the present invention may be had by reference to the following description taken in connection with the accompanying drawings which form a part of the application in which:

Figure 1 is an elevational view for schematically showing a typical catalytic cracking system employing a pneumatic lift for elevating pelleted catalyst or contact material.

Figure 2 is an enlarged view in sectional elevation showing the invention as applied to the engaged portion of the system.

Figure 3 is a horizontal sectional view through an engager 10 employing a multiple elevating conduit system.

Referring to Figure 1 of the drawing, which shows diagrammatically the conventional elements of a continuous system, a lower receptacle or chamber 10 functions as a catalyst engaging zone, that is, a zone wherein the catalyst is engaged by the air, flue gas or steam supplied thereto by suitable means. The lift pipe or elevating conduit is indicated at 11 and has its lower end communicating with the chamber 10 and an upper end communicating with an upper chamber 12 which is the disengaging chamber or zone wherein the material is disengaged from the air or other elevating medium. The lifting medium is discharged from the upper chamber 12 through a conduit 13 and is passed to any conventional separating means such as a cyclone separator 14 having an upper conduit 15 in communication therewith to remove the lifting medium and a lower conduit 16 for removing any fines which had been entrained in the lifting medium.

The catalyst which remains in the disengager 12 is returned through conduit 17 by gravity to an upper reaction chamber 18 wherein usually an on-stream reaction is effected to obtain the desired product and continues to flow therefrom through conduit 19 by gravity into a lower reaction chamber 20 wherein the catalyst or contact material is regenerated to remove therefrom any deposits which might have been formed in the upper chamber 18. From the lower chamber 20 the catalyst or contact material continues to flow by gravity through conduit 21 and is returned to the engaging chamber 10. The conduits 17, 19 and 21 through which the catalyst or contact material flows in returning from the disengager 12 to the engager 10 are usually provided with means for supplying steam or other gaseous purging medium thereto in order to prevent reaction products formed in chamber 18 and regeneration fumes formed in chamber 20 from communicating with the other chambers in the unit.

Referring to Figure 2, the engager 10 receives the contact material C through conduit 21, as explained in connection with Figure 1 and the material will acquire an angle of repose which is generally indicated by the dashed lines in Figure 2. The elevating conduit is shown at 30 and has its inlet end portion 31 extending into the engager 10. A sleeve 32 having an upper closed end 33 and an open lower end 34 is arranged exteriorly of the lower end portion 31 of the conduit providing a space 35 therewith. An elevating fluid supply conduit 36 communicates with the space 35 for supplying fluid thereto for passage downwardly therethrough to the lower end portion 34 of the sleeve 32.

The lower end portion 34 of the sleeve extends laterally inwardly and upwardly about and in spaced relation with the lower end portion 31 of the elevating conduit providing in effect, a nozzle 37 extending into the lower end portion 31 of the elevating conduit 30 through which contact material from the mass C is admitted or supplied to the lower end 31 of the elevating conduit for passage through the conduit 30 to the upper vessel or receptacle 12. The nozzle 37 formed by the lower end portion 34 of the sleeve provides an annulus A with the lower end portion 31 of the elevating conduit. An elevating fluid supply conduit 38 is also provided and extends through a wall of the lower engager vessel 10 and has its upper inlet end 39 disposed in a plane below that of the nozzle 37 providing a space S therebetween for receiving contact material for passage into the inlet end portion of the conduit from the zone S.

The conduit arrangement described herein is adapted particularly to be used in a multiconduit elevating system as shown in Figure 3 and is designed in such a manner that the lifting or elevating fluid and the volume of contact material supplied to the inlet of each conduit will be maintained in balance so that each conduit of the system will operate in a continuous and effective manner. To accomplish this the lower end portion 34 of each sleeve will be provided, as shown in Figure 2, with a circumferential apertured area which may be comprised of a plurality of circumferentially spaced apertures or openings 40 or the apertured area may take the form of a circumferential slot. A plate 41 is secured to the outer wall of the sleeve in a plane above the apertured area 40. The apertured area in the sleeve provides an arrangement for dividing the stream of elevating fluid passing downwardly through the space 35 into cooperating streams, one of which will be directed upwardly into the inlet end portion 31 of conduit 30 through the annulus A while the other stream will pass from the space 35 through the apertured area 40 and be directed downwardly by the baffle means 41 to pass through a portion of the body of contact material C and carry the contact material into the zone S from which it is lifted by the fluid from conduit 38 into the lower end portion 31 of the elevating conduit through the nozzle 37.

In operation an elevating system involving the use of a multiplicity of the above-described elevating conduits the elevating fluid will be supplied originally at a low velocity to each space 35 surrounding the lower end portions 31 of the conduits and while the fluid is at a relatively low velocity it will by-pass the apertured area 40 in the sleeve 32 and primarily flow upwardly into the elevating conduits through the annular spaces A between the nozzles 37 and the lower ends of the elevating conduits. As the velocity of fluid through the annular spaces 35 approaches the critical stage or attains a velocity where the fluid stream becomes divided and a portion thereof passes through the apertured areas 40 directly to the contact material sufficient pressure will be exerted on the contact material by this stream or streams of fluid passing from the space 35 to force the material into the inlet ends of the conduits through the nozzles 37. Thus when the fluid passing from the apertured areas 40 to the contact material reaches such a velocity and one or more of the lifts becomes temporarily overloaded due to the increased volume of contact material in the zone S the fluid stream from space or spaces 35 will become automatically decreased through the apertured areas 40 and a greater volume of fluid will pass through the annulus A until the flow of the contact material through all of the elevating conduits returns to normal operation.

I claim:

1. Apparatus for elevating contact material from a lower chamber to an upper chamber which comprises an upright elevating conduit having an open inlet end extending through the top of said lower chamber to be positioned therewithin and its upper end extending into the upper chamber, means for supplying contact material to the lower chamber, a sleeve having an upper closed end and with a lower open end positioned about the lower portion of the elevating conduit providing a lifting fluid supply space therewith, said sleeve lower end portion curving laterally inwardly in spaced relation and below the inlet end of the conduit and then upwardly providing a contact material nozzle extending into the conduit inlet end and an annular fluid space therewith, said sleeve having a circumferential apertured area above its open end, means for supplying a fluid to said lifting fluid space about the conduit for passage downwardly thereof, said apertured area in the sleeve providing for lateral passage of a portion of the fluid from the space in streams, baffle means exteriorly of the conduit and above the apertured area to direct the contact material through the nozzle into the inlet end of the elevating conduit to be picked up by the balance of the elevating fluid from said lifting fluid supply space through said annular fluid space around the nozzle.

2. Apparatus for elevating contact material from a lower chamber to an upper chamber which comprises a multiplicity of upright elevating conduits each having an open inlet end extending through the top of said lower chamber to be positioned therewithin and an upper end extending into the upper chamber, means for supplying contact material to the lower chamber, a sleeve having an upper closed end with a lower open end positioned about the lower portion of each of the elevating conduits providing a lifting fluid supply space within each conduit, the lower end portion of each sleeve curving laterally inwardly in spaced relation and below the inlet end of its elevating conduit and then upwardly providing a contact material nozzle extending into the conduit inlet end and an annular fluid space therewith, each of said sleeves having a circumferential apertured area above its open end, means for supplying a fluid to said lifting fluid space about each conduit for passage downwardly thereof, said apertured area in each sleeve providing for lateral passage of a portion of the fluid from the space in a stream, baffle means exteriorly of each conduit and above its apertured area to direct the contact material through the nozzle into the inlet end of the elevating conduit to be picked up by the balance of the elevating fluid passing through said annular fluid space in order to maintain substantially constant volumes of contact material passing from the lower chamber to the upper chamber through each elevating conduit.

3. Apparatus for elevating contact material from a lower chamber to an upper chamber which comprises, an upright elevating conduit having an inlet end extending into the lower chamber and its upper outlet end extending into the upper chamber, a sleeve having an upper closed end with a lower open end portion positioned about the lower portion of the elevating conduit providing a lifting fluid space therewith, said sleeve lower open end portion having an apertured area therein disposed in a plane above the inlet end of the elevating conduit and therebelow curving inwardly and upwardly and terminating in a nozzle end disposed within the inlet end of the elevating conduit and providing an annular space therewith, means for supplying fluid to said lifting fluid space about the conduit for passage downwardly thereof, said apertured area in the sleeve permitting the passage of a portion of the fluid from the space in a stream directly into the contact material to move it through the nozzle and into the inlet end of the elevating conduit to be picked up by the balance of the elevating fluid passing upwardly in a stream through said annular fluid space.

WILLIAM L. McCLURE.

References Cited in the file of this patent

UNITED STATES PATENTS

| Number | Name | Date |
|---|---|---|
| 1,416,013 | Gieseler | May 16, 1922 |
| 2,301,617 | Cox | Nov. 10, 1942 |
| 2,600,528 | Grace | June 17, 1952 |

FOREIGN PATENTS

| Number | Country | Date |
|---|---|---|
| 7,075 | Netherlands | Mar. 18, 1922 |